United States Patent
Sasaki

(10) Patent No.: US 10,212,292 B2
(45) Date of Patent: *Feb. 19, 2019

(54) JOB MANAGEMENT APPARATUS OF PRINT JOB IN DELIVERY SYSTEM FOR DELIVERING SHEET PRINTED BY IMAGE FORMING APPARATUS TO DELIVERY DESTINATION WITH AUTONOMOUSLY MOVING DELIVERY APPARATUS

(71) Applicants: KABUSHIKI KAISHA TOSHIBA, Minato-ku, Tokyo (JP); TOSHIBA TEC KABUSHIKI KAISHA, Shinagawa-ku, Tokyo (JP)

(72) Inventor: Takahiro Sasaki, Sunto Shizuoka (JP)

(73) Assignees: KABUSHIKI KAISHA TOSHIBA, Tokyo (JP); TOSHIBA TEC KABUSHIKI KAISHA, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/705,346

(22) Filed: Sep. 15, 2017

(65) Prior Publication Data

US 2018/0007218 A1    Jan. 4, 2018

Related U.S. Application Data

(63) Continuation of application No. 14/996,398, filed on Jan. 15, 2016, now Pat. No. 9,800,746.

(51) Int. Cl.
*H04N 1/00* (2006.01)
*G06F 3/12* (2006.01)

(52) U.S. Cl.
CPC ....... *H04N 1/00344* (2013.01); *G06F 3/1201* (2013.01); *G06F 3/126* (2013.01);
(Continued)

(58) Field of Classification Search
None
See application file for complete search history.

(56) References Cited

U.S. PATENT DOCUMENTS

2005/0004705 A1    1/2005    Stringham et al.
2009/0143910 A1    6/2009    Seo et al.

FOREIGN PATENT DOCUMENTS

JP    2006-321583    11/2006

OTHER PUBLICATIONS

Machine Translation in English of JP Pub 2006-321583 to Yamada Masaaki.*

(Continued)

*Primary Examiner* — Benny Q Tieu
*Assistant Examiner* — Haris Sabah
(74) *Attorney, Agent, or Firm* — Amin, Turocy & Watson LLP

(57) ABSTRACT

Generally, a job management apparatus of the present embodiment which sends a print job to an image forming apparatus comprises a communication section and a controller. The communication section communicates with the image forming apparatus and a delivery apparatus configured to deliver a sheet printed by the image forming apparatus to a delivery destination. The controller calculates printing time relating to completion of execution of the print job by the image forming apparatus and first arrival time when the delivery apparatus reaches the image forming apparatus and enables the image forming apparatus to execute the print job at a timing when the image forming apparatus can complete the execution of the print job by the first arrival time.

6 Claims, 3 Drawing Sheets

(52) U.S. Cl.
CPC .......... *G06F 3/1207* (2013.01); *G06F 3/1211* (2013.01); *G06F 3/1285* (2013.01); *H04N 1/00015* (2013.01); *H04N 1/00068* (2013.01); *H04N 2201/0094* (2013.01)

(56) References Cited

OTHER PUBLICATIONS

Non-Final Office Action for U.S. Appl. No. 14/996,398 dated Dec. 12, 2016.

\* cited by examiner

JOB MANAGEMENT APPARATUS OF PRINT JOB IN DELIVERY SYSTEM FOR DELIVERING SHEET PRINTED BY IMAGE FORMING APPARATUS TO DELIVERY DESTINATION WITH AUTONOMOUSLY MOVING DELIVERY APPARATUS

CROSS-REFERENCE TO RELATED APPLICATIONS

This application is a Continuation of application Ser. No. 14/996,398 filed Jan. 15, 2016, the entire contents of which are incorporated herein by reference.

FIELD

Embodiments described herein generally relate to a job management apparatus of a print job in a delivery system for delivering a sheet printed by an image forming apparatus to a delivery destination with a delivery apparatus which moves autonomously.

BACKGROUND

If a sheet is printed by an image forming apparatus, there exists a delivery system in which a delivery apparatus delivers the sheet to a delivery destination.

After the delivery apparatus autonomously travels to deliver a sheet to the delivery destination, the delivery apparatus returns to the image forming apparatus. The image forming apparatus executes a next print job if the delivery apparatus returns to an initial position thereof. If receiving a sheet from the image forming apparatus, the delivery apparatus delivers the sheet to a newly set delivery destination.

In such a delivery system, prompt delivery is purposed.

DETAILED DESCRIPTION

Generally, a job management apparatus of the present embodiment, which sends a print job to an image forming apparatus, comprises a communication section and a controller. The communication section communicates with the image forming apparatus and a delivery apparatus which delivers a sheet printed by the image forming apparatus to a delivery destination. The controller calculates printing time relating to completion of a print job executed by the image forming apparatus and a first arrival time when the delivery apparatus reaches the image forming apparatus and enables the image forming apparatus to execute the print job at a timing when the image forming apparatus completes an execution of the print job by the first arrival time.

Hereinafter, embodiments are described with reference to the accompanying drawings.

First Embodiment (Whole Structure)

Figure 1:
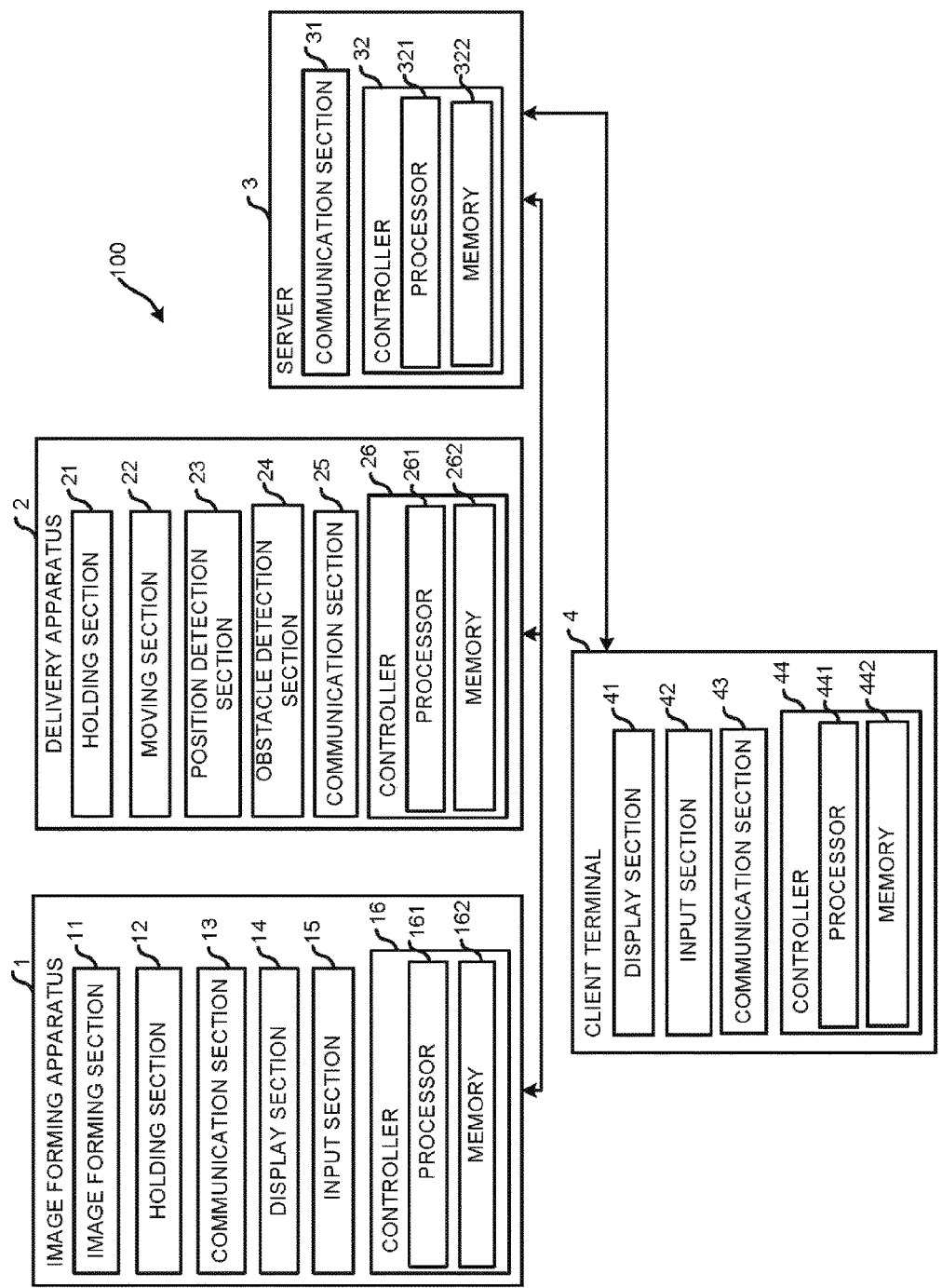
FIG. 1 is a diagram illustrating a structure of a delivery system.

FIG. 1 is a diagram illustrating a structure of a delivery system 100.

The delivery system 100 comprises an image forming apparatus 1, a delivery apparatus 2, a server 3 and a client terminal 4.

In the delivery system 100, the client terminal 4 sends a print job and a delivery destination to which a sheet is delivered to the server 3. The server 3 sends a delivery route to a delivery destination to the delivery apparatus 2 and sends the print job to the image forming apparatus 1 at the same time. If receiving a printed sheet from the image forming apparatus 1, the delivery apparatus 2 delivers the sheet to the delivery destination.

In a case in which the delivery apparatus 2 does not return to the image forming apparatus 1 at the time the server 3 receives the print job from the client terminal 4, the server 3 carries out the following processing.

In other words, the server 3 enables the image forming apparatus 1 to execute the print job at the timing when the image forming apparatus 1 can complete the execution of the print job by the arrival time of the delivery apparatus 2 to the image forming apparatus 1.

(Structure of the Image Forming Apparatus)

The image forming apparatus 1 is an MFP (Multi-Function Peripheral) which has a plurality of functions such as a copy function, a print function, a scan function, a FAX function, an Email sending function and the like.

The image forming apparatus 1 includes an image forming section 11, a holding section 12, a communication section 13, a display section 14, an input section 15 and a controller 16.

A transfer system of transferring an image to a sheet by the image forming section 11 is an electrophotographic system. The image forming section 11 forms a toner image on a photoconductor that is exposed by a laser and transfers the toner image onto the sheet. The image forming section 11 may form an image on the sheet with an inkjet system or a thermal printer system in addition to the electrophotographic system.

The holding section 12 holds the sheet on which the image forming section 11 forms an image. The holding section 12, for example, is a holding tray to which the sheet on which the image forming section 11 prints the image is discharged. A gap is arranged in the holding tray such that the delivery apparatus 2 grasps the sheet easily.

The communication section 13 communicates with the server 3 in a wired or a wireless manner.

The display section 14 displays setting information an operation status of the image forming apparatus 1, login information and a notification to a user.

The input section 15 includes buttons or keys and a touch panel. The input section 15 receives an input by a user and an instruction of a function operation of the image forming apparatus 1 such as a printing instruction.

The controller 16 controls the whole of the image forming apparatus 1. The controller 16 sends current state of the image forming section 11 to the server 3. The controller 16 includes a processor 161 and a memory 162. The processor 161 executes various processing by reading programs in the memory 162.

(Structure of the Delivery Apparatus)

If receiving a sheet from the image forming apparatus 1, the delivery apparatus 2 which is originally in the image forming apparatus 1 delivers the sheet to the delivery destination. After completing the delivery, the delivery apparatus 2 returns to the original position in the image forming apparatus 1. The structure of the delivery apparatus 2 may be optional as long as the delivery apparatus 2 can receive the sheet from the image forming apparatus 1, hold the sheet and move to the delivery destination. The delivery apparatus 2 may travel with a wheel or fly with a propeller. The delivery apparatus 2 includes a holding section 21, a moving section 22, a position detection section 23, an obstacle detection section 24, a communication section 25 and a controller 26.

The holding section 21 receives a sheet from the image forming apparatus 1 and holds the sheet. The holding section 21 can drop the sheet or hand over the sheet to other party at the delivery destination. The holding section 21, for example, holds the sheet on the holding section 12 from upper and lower sides through the gap arranged in the holding section 12 (the holding tray) of the image forming apparatus 1. In this way, the holding section 21 receives the sheet from the image forming apparatus 1 and holds the sheet simultaneously.

The moving section 22 enables the delivery apparatus 2 to move. The moving section 22 includes a wheel or propeller and a motor or engine acting as a driving source of the wheel or the propeller.

The position detection section 23 detects position information for detecting a current position of the delivery apparatus 2. The position detection section 23 may be, for example, a camera or a receiving device which receives electric wave from a beacon used for the position measurement or a signal from a GPS (Global Positioning System) satellite. For example, the position information of the delivery apparatus 2 may be acquired based on a position associated with a marker captured by a camera, or may be acquired based on identification information of a beacon generating electric wave received by the receiving device. The position information of the delivery apparatus 2 may be acquired based on a signal from a GPS satellite.

The obstacle detection section 24 which is an ultrasonic wave sensor or a camera detects an obstacle that hinders the movement of the delivery apparatus 2.

The communication section 25 communicates with the server 3 in a wired or wireless manner.

The controller 26 controls the whole of the delivery apparatus 2. The controller 26 regularly sends a state containing the current position information of the delivery apparatus 2 to the server 3. The controller 26 includes a processor 261 and a memory 262. The processor 261 executes various processing by reading programs in the memory 262.

(Structure of the Server)

The server 3 includes a communication section 31 and a controller 32.

The communication section 31 communicates with the image forming apparatus 1, the delivery apparatus 2, and the client terminal 4 in a wired or wireless manner.

The server 3 regularly communicates with the delivery apparatus 2 to acquire the current position information or the state of the delivery apparatus 2. The server 3 regularly communicates with the image forming apparatus 1 to acquire the state of the image forming apparatus 1.

The controller 32 includes a processor 321 and a memory 322. The processor 321 carries out various processing by reading programs in the memory 322.

The memory 322 previously stores information required by the processing in Acts 302 and 305 described later. The information is exemplified as follows.

machine body information of the image forming apparatus 1 (job information capable of being processed such as monochrome printing or color printing, type of an attached finisher, the number of prints per unit time and average time required by a warming-up operation)

the position information of the image forming apparatus 1 machine body information of the delivery apparatus 2 (maximum number of sheets that can be held and average movement speed)

position information of the obstacle inside institution where the delivery apparatus 2 delivers the sheet and a map information containing an area where the delivery apparatus 2 is movable.

(Structure of the Client Terminal)

The client terminal 4, which is, for example, a PC (Personal Computer), includes a display section 41, an input section 42, a communication section 43, and a controller 44.

The display section 41 displays a print setting screen by a printer driver.

The input section 42 includes buttons or keys and a touch panel. The input section 42 receives input of a user, and receives an instruction of setting of printing or setting of the delivery destination.

The communication section 43 communicates with the image forming apparatus 1, the delivery apparatus 2, and the server 3 in a wired or wireless manner.

The controller 44 includes a processor 441 and a memory 442. The processor 441 carries out various processing by reading programs in the memory 442.

(Delivery Processing if the Delivery Apparatus 2 does not Return when the Server 3 Receives a Print Job)

Figure 2:
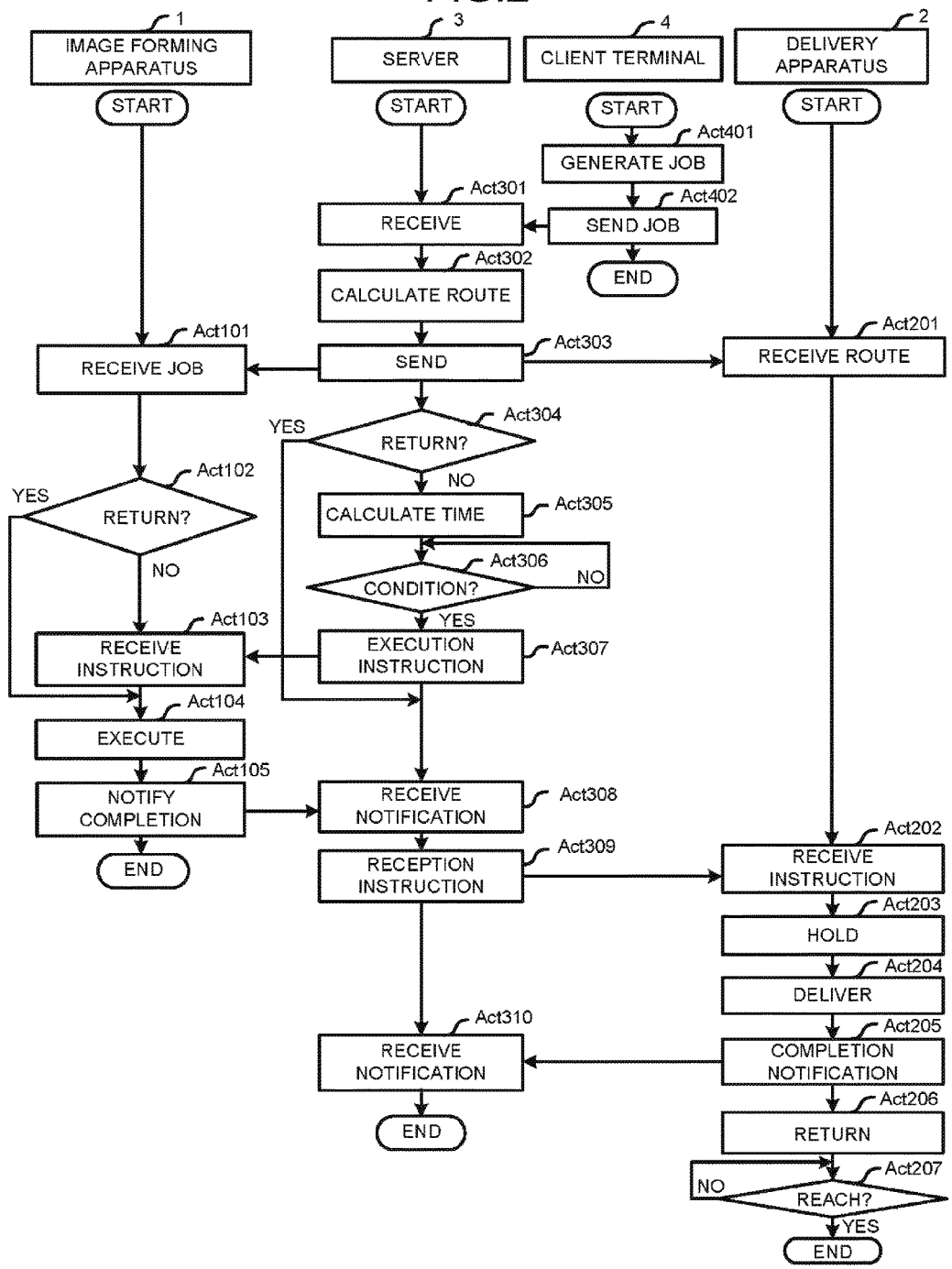
FIG. 2 is a flowchart illustrating procedures of a delivery processing in the delivery system.

Hereinafter, the delivery processing executed by the delivery system 100 is described with reference to FIG. 2. In the following delivery processing, the processors 161, 261, 321 and 441 of the image forming apparatus 1, the delivery apparatus 2, the server 3 and the client terminal 4 execute each processing by executing programs stored in the memories 162, 262, 322 and 442.

First, the delivery processing executed by the delivery system 100 is described in a case in which the delivery apparatus 2 is returning from the delivery destination but does not return to the image forming apparatus 1.

Through an input by a user, the client terminal 4 activates a printer driver and displays a print setting screen. In the print setting screen, the print setting by the image forming apparatus 1 and the delivery destination of the sheet printed by the image forming apparatus 1 which is delivered by the delivery apparatus 2 can be set.

The client terminal 4 receives the delivery destination and the print setting to generate the print job (Act 401).

The client terminal 4 sends the print job containing the delivery destination to the server 3 (Act 402).

The server 3 (the controller 32) receives the print job (Act 301).

The server 3 determines a moving route of the delivery apparatus 2 from the image forming apparatus 1 to the delivery destination based on the delivery destination, the position information of the image forming apparatus 1 and the map information with the use of a well-known method such as a Dijkstra method (Act 302). Further, the server 3 uses the map information and the position information of the image forming apparatus 1 previously stored in the memory 322.

The server 3 communicates with the delivery apparatus 2 to regularly acquire the current position of the delivery apparatus 2.

The server 3 sends the print job to the image forming apparatus 1. The server 3 sends the print job and the information that the delivery apparatus 2 does not return to the image forming apparatus 1 in a case in which the delivery apparatus 2 does not return to the image forming apparatus 1 to the image forming apparatus 1. The server 3 sends the delivery route to the delivery apparatus 2 (Act 303).

In a case in which the delivery apparatus 2 does not return to the image forming apparatus 1 (Act 304: NO) at the time the print job is received, the server 3 calculates printing time $Time_{to\_print}$ relating to the completion of the print job executed by the image forming apparatus 1 and a arrival time (a first arrival time) $Time_{to\_reach}$ of the delivery apparatus 2 from the current position to the image forming apparatus 1 (Act 305).

The server 3 calculates the printing time $Time_{to\_print}$ with the use of the following Eq.1.

$$Time_{to\_print} = (Page_{oftheJob}/Page_{per\_min}) + T_{warmup} \times State_{warmup} \qquad Eq.1$$

The phrases in Eq.1 indicate the following meanings.
$Page_{oftheJob}$ . . . number of pages of the print data
$Page_{per\_min}$ . . . printing ability of the image forming apparatus 1 per unit time
$T_{warmup}$ . . . average time of warm-up
$State_{warmup}$ . . . state value indicating whether or not the image forming apparatus 1 completes the warm-up operation The memory 322 stores the $Page_{per\_min}$ and the $T_{warmup}$.

The server 3 calculates the moving distance $Distance_{current}$ of the delivery apparatus 2 from the current position of the delivery apparatus 2 to the image forming apparatus 1 based on the map information stored in the memory 322.

The server 3 calculates the arrival time $Time_{to\_reach}$ when the delivery apparatus 2 reaches the image forming apparatus 1 from the current position with the use of the following Eq.2.

$$Time_{to\_reach} = Distance_{current}/Speed_{per\_min} \qquad Eq.2$$

The phrases in Eq.2 indicate the following meanings.
$Speed_{per\_min}$ . . . average moving speed of a sheet by the delivery apparatus 2

The memory 322 stores the $Speed_{per\_min}$.

The server 3 enables the image forming apparatus 1 to execute the print job at the timing when the image forming apparatus 1 can complete the execution of the print job by the arrival time $Time_{to\_reach}$.

Specifically, the server 3, for example, updates the arrival time $Time_{to\_reach}$ at every fixed time. The server 3 sends an instruction of the execution of the print job to the image forming apparatus 1 (Act 307) at the timing when the printing time $Time_{to\_print}$ is equal to the arrival time $Time_{to\_reach}$ or at the timing when the arrival time $Time_{to\_reach}$ is lower than the threshold value (Act 306: YES).

The server 3 may calculate a difference time $Time_{to\_wait}$ with the use of the following Eq.3 in Act 305.

$$Time_{to\_wait} = Time_{to\_reach} - Time_{to\_print} \qquad Eq.3$$

The server 3, at a wait timing of the difference time $Time_{to\_wait}$ (Act 306: YES), may send an instruction of the execution of the print job to the image forming apparatus (Act 307).

The image forming apparatus 1 receives the print job and the information that the delivery apparatus 2 does not return to the image forming apparatus 1 from the server 3 through the processing in Act 303 executed by the server (Act 101).

The image forming apparatus 1 reserves the print job without executing the print job in a case in which the delivery apparatus 2 does not return to the image forming apparatus 1 (Act 102: NO).

The image forming apparatus 1 executes the print job (Act 104) if the instruction of the execution of the print job is received (Act 103).

The image forming apparatus 1 notifies the server 3 of the completion of the execution of the print job (Act 105).

The server 3 receives the notification of the completion of the execution of the print job from the image forming apparatus 1 (Act 308).

The server 3 notifies the delivery apparatus 2 to receive the sheet printed by the image forming apparatus 1 from the image forming apparatus 1 (Act 309).

The delivery apparatus 2 receives the delivery route from the server 3 through the processing in Act 303 executed by the server 3 (Act 201).

The delivery apparatus 2 receives the instruction of the reception of the sheet from the server 3 (Act 202).

The delivery apparatus 2 receives the sheet from the image forming apparatus 1 and holds the sheet (Act 203).

The delivery apparatus 2 leaves the original position in the image forming apparatus 1 and moves towards the delivery destination based on the delivery route. The delivery apparatus 2 delivers the sheet to the delivery destination by dropping the sheet if the delivery apparatus 2 reaches the delivery destination (Act 204).

The delivery apparatus 2 sends the information that the delivery is completed to the server 3 (Act 205).

The server 3 receives the notification of the completion of the delivery from the delivery apparatus 2 (Act 310).

The delivery apparatus 2 moves towards the image forming apparatus 1 based on the delivery route to return to the image forming apparatus 1 (Act 207).

The present processing of the delivery apparatus 2 is terminated if the delivery apparatus 2 returns to the image forming apparatus 1 (Act 207: YES).

(IF the Delivery Apparatus 2 Goes Back at the Time the Server 3 Receives the Print Job)

Hereinafter, the processing executed by the delivery system 10 in a case in which the delivery apparatus 2 returns to the image forming apparatus 1 at the time the server 3 receives the print job.

In this case, in Act 303, the server 3 does not notify the image forming apparatus 1 that the delivery apparatus 2 does not return to the image forming apparatus 1.

In a case in which the image forming apparatus 1 only receives the print job (Act 101) and does not receive the information that the delivery apparatus 2 does not go back (Act 102: YES), the image forming apparatus 1 executes the print job without waiting for the execution instruction from the server 3 (Act 104).

The image forming apparatus 1 notifies the completion of the execution of the print job to the server 3 (Act 105).

In a case in which the delivery apparatus 2 returns to the image forming apparatus 1 (Act 304: YES) at the time of the reception of the print job, the server 3 receives the execution completion notification of the print job from the image forming apparatus 1 without sending the execution instruction of the print job to the image forming apparatus 1 (Act 308).

(Notification Processing about a Delivery Completion Time and a Processing at the Time of Occurrence of Failure)

Figure 3:
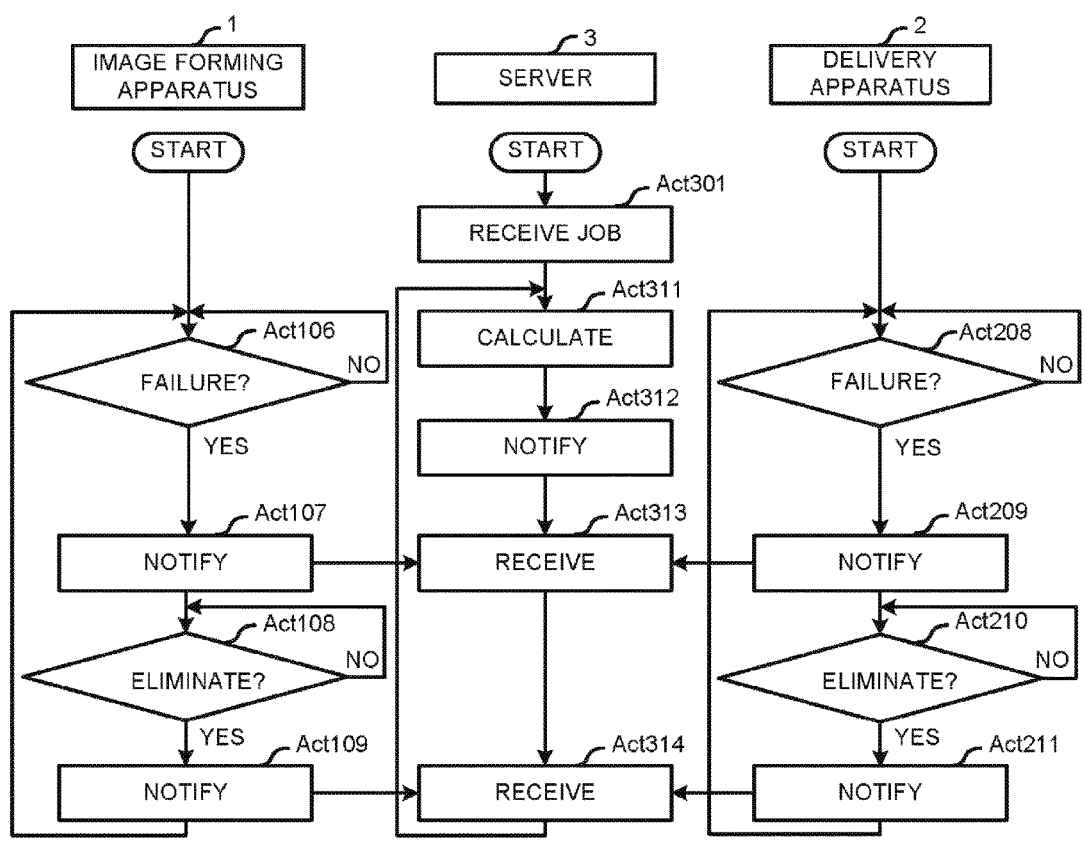
FIG. 3 is a flowchart illustrating procedures of a notification processing about a delivery completion time and a processing executed at the time a failure occurs.

The notification processing of the delivery completion time to a notification destination which is executed by the server 3 and a processing executed by the delivery system 100 at the time failure occurs in the image forming apparatus 1 and the delivery apparatus 2 are described with reference to FIG. 3.

After receiving the print job from the client terminal 4 (Act 301), the server 3 calculates an arrival time (a second arrival time) from the moment the delivery apparatus 2 leaves the image forming apparatus 1 to the moment the delivery apparatus 2 reaches the delivery destination (Act 311).

First, the server 3 calculates the first time obtained by dividing a distance from the image forming apparatus 1 to the delivery destination by an average speed of the delivery apparatus 2.

In a case in which the delivery apparatus 2 returns to the image forming apparatus 1, the server 3 calculates an arrival time of the delivery apparatus 2 to the delivery destination by adding the execution completion time of the print job to the first time.

In a case in which the delivery apparatus 2 does not return to the image forming apparatus 1, the server 3 calculates an arrival time of the delivery apparatus 2 to the delivery destination by adding the arrival time $Time_{to\_reach}$ calculated according to the Eq.3 to the first time.

The server 3 notifies the notification destination of the arrival time of the delivery apparatus 2 to the delivery destination (Act 312). The notification destination is, for example, an address of a portable terminal with which a user registers the server 3.

If the failure occurs in the image forming apparatus 1 and the delivery apparatus 2 (Act 106: YES, Act 208: YES), the image forming apparatus 1 and the delivery apparatus 2 notify the server 3 of the occurrence of the failure (Act 107, Act 209). The failure of the image forming apparatus 1 refers to a jam of the sheet. The failure of the delivery apparatus 2 refers to a reversal.

The image forming apparatus 1 and the delivery apparatus 2 notify the server 3 of elimination of the failure (Act 109, Act 211) if the failures thereof are eliminated through an operation of a user (Act 108: YES, Act 210: YES).

The server 3, if receiving the elimination of the failure (Act 314), calculates the arrival time of the delivery apparatus 2 to the delivery destination again to update the arrival time (Act 311), and notifies the arrival time to the notification destination again (Act 312).

Second Embodiment

In the first embodiment, the delivery apparatus 2 moves from a specified original position in the image forming apparatus 1 towards the delivery destination and returns to the specified position in the image forming apparatus 1 after the delivery is terminated.

In the second embodiment, the number of the image forming apparatuses 1 is N (greater than 2). The delivery apparatus 2 returns to the image forming apparatus 1 to which the delivery time becomes smaller in the delivery system 100 and receives the delivered sheet.

The points of the delivery processing executed by the delivery system 100 in the second embodiment different from the first embodiment are described with reference to FIG. 2.

In the delivery system 100, a plurality of image forming apparatuses 1 execute the print jobs.

The server 3, if receiving a new print job (Act 301), specifies an image forming apparatus 1 to which the delivery time from present time to the completion of the delivery is smallest and calculates the route to the image forming apparatus 1 (Act 302).

In Act 302, the server 3 first calculates the end time $Time_{before\_ready}^{i}$ ($i=0\ldots N$) of the print job that is being executed for the N image forming apparatuses 1 with the use of the following formula Eq.4.

In a case in which the $Time_{before\_ready}^{i}$ is below 0 or for the image forming apparatus 1 that is not executing the print job at the current time, the $Time_{before\_ready}^{i}$ is regarded as 0.

$$Time_{before\_ready}^{i} = \{(Page_{oftheJob}^{i}/Page_{per\_min}^{i}) + T_{warmup}^{i} \times State_{warmup}^{i}\} - (Time_{start}^{i} - Time_{Current}^{i})(i=0\ldots N) \quad \text{Eq.4}$$

The phrases in Eq.4 indicate the following meanings.

$Page_{oftheJob}^{i}$ ... page number of the print job that the i-th image forming apparatus 1 lastly starts to execute $Page_{per\_min}^{i}$ ... number of prints per unit time of the i-th image forming apparatus 1

$T_{warmup}^{i}$ ... average warming-up time of the i-th image forming apparatus 1

$State_{warmup}^{i}$ ... a value indicating the state of warming-up of the i-th image forming apparatus 1

$Time_{start}^{i}$ ... time when the print job being executed at current time starts $Time_{Current}^{i}$ ... current time The memory 322 stores the $Page_{per\_min}^{i}$ and the $T_{warmup}^{i}$.

Next, the server 3 calculates the printing time $Time_{to\_print}^{i}$ i-th relating to the execution completion of the print job in the i-th image forming apparatus 1 with the use of the following formula Eq.5.

$$Time_{to\_print}^{i} = (Page_{oftheJob}^{i}/Page_{per\_min}^{i}) + T_{warmup}^{i} \times State_{warmup}^{i} (i=0\ldots N) \quad \text{Eq.5}$$

The server 3 calculates the arrival time $Time_{to\_reach}^{i}$ when the delivery apparatus 2 reaches the i-th image forming apparatus 1 in a case in which the delivery apparatus 2 moves from the current position to the i-th the image forming apparatus 1 with the use of the following formula Eq.6.

$$Time_{to\_reach}^{i} = Distance_{current}^{i}/Speed_{per\_min}(i=0\ldots N) \quad \text{Eq.6}$$

The server 3 calculates the arrival time $Time_{to\_deliver}^{i}$ when the delivery apparatus 2 reaches the delivery destination in a case in which the delivery apparatus 2 moves from the i-th image forming apparatus to the delivery destination with the use of the following formula Eq.7.

$$Time_{to\_deliver}^{i} = Distance_{to\_user}/Speed_{per\_min}(i=0\ldots N) \quad \text{Eq.7}$$

The server 3 calculates the time $Time_{\_to\_start\_deliver}^{i}$ when the image forming apparatus 1 terminates the printing and the delivery apparatus 2 grasps the sheet and starts the delivery with the use of the following formula Eq.8. Further, the function max (x,y) takes a greater value between x and y.

$$Time_{\_to\_start\_deliver}^{i} = \max(Time_{to\_reach}^{i}, Time_{to\_print}^{i}) (i=0\ldots N) \quad \text{Eq.8}$$

In a case in which the i-th image forming apparatus 1 executes the print job, the server 3 uses the time calculated through the Eq.4-Eq.8 to calculate the time $Time_{\_to\_complete}$ required until the delivery is completed with the user of the following formula Eq.9.

$$Time_{\_to\_complete}^{i} = Time_{before\_ready}^{i} + Time_{\_to\_start\_deliver}^{i} + Time_{to\_deliver}^{i}(i=0\ldots N) \quad \text{Eq.9}$$

The meaning of Eq.9 is as follows.

The time from current time to the completion of the delivery job=the time until the print job being executed is completed+the time relating to the completion of a new print job+the time relating to the completion of the delivery The server 3 specifies the image forming apparatus 1 the $\text{Time}_{to\_complete}^{i}$ of which is minimal.

The server 3 sends the moving route to the image forming apparatus 1 to the delivery apparatus 2 (Act 303).

The following processing is the same as the processing described in the first embodiment.

In this way, in the second embodiment, the time relating to the printing by the image forming apparatus 1 and the time relating to the delivery by the delivery apparatus 2 can be minimal and the printing and the delivery can be effectively carried out.

Furthermore, in Act 302, in order to carry out the delivery of the printed sheet, the server 3 calculates the time from the current time to the completion of the delivery job for all candidates (N image forming apparatuses 1) of the sending destination of a new print job.

The server 3 excludes the image forming apparatus 1 in which sheet jam already occurs from the candidates of the sending destination of the new print job at the time of executing the calculation. The server 3 sends the new print job to the image forming apparatus 1 of which the time from the current time to the completion of the delivery job is shortest.

In a case in which the sheet jam occurs in the execution of the received new print job, the image forming apparatus 1 notifies the occurrence of the sheet jam to the server 3. In this case, the server 3 calculates the time from the current time to the completion of the delivery job for all candidates of the sending destination of the new print job again. At this time, the server 3 excludes the image forming apparatus 1 from which the occurrence of the sheet jam is notified from the candidates.

Further, in a case in which a sheet jam occurs in the execution of the new print job in the image forming apparatus 1 or in a case in which a failure occurs in the delivery apparatus 2, the server 3 receives notification of the occurrence of the sheet jam or the occurrence of the failure from the image forming apparatus 1 or the delivery apparatus 2. Thus, the server 3 notifies the occurrence of the sheet jam in the image forming apparatus or the occurrence of the failure in the delivery apparatus 2 to a preset notification destination.

(Modification)

In the first embodiment, the image forming apparatus 1 executes the print job immediately after the server 3 sends the instruction of the execution of the print job to the image forming apparatus 1. However, the server 3 may send the execution timing of the print job to the image forming apparatus 1 in advance. The execution timing is a timing when the image forming apparatus 1 can complete the execution of the print job at the time the delivery apparatus 2 reaches the image forming apparatus 1. Alternatively, the execution timing is a timing at which the image forming apparatus 1 can complete the execution of the print job when the time at which the delivery apparatus 2 reaches the image forming apparatus 1 is smaller than a threshold value.

As stated above in detail, the job management apparatus of the print job in the delivery system in which the delivery can be rapidly executed can be supplied.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. A job management apparatus for sending a print job to an image forming apparatus, comprising:
   a processor configured to:
   communicate with the image forming apparatus and a delivery apparatus configured to deliver a sheet printed by the image forming apparatus to a delivery destination; and
   calculate printing time relating to completion of execution of the print job by the image forming apparatus and a first arrival time when the delivery apparatus reaches the image forming apparatus, and to enable the image forming apparatus to execute the print job at a timing when the image forming apparatus can complete the execution of the print job by the first arrival time, and to calculate a second arrival time when the delivery apparatus reaches the delivery destination, and to notify the second arrival time to a registered notification destination, and to updates, in a case in which failures occur in the image forming apparatus and the delivery apparatus, the second arrival time, and notify the notification destination of the updated second arrival time.

2. The job management apparatus according to claim 1, wherein the image forming apparatus and the delivery apparatus notify the job management apparatus of elimination of the failures, if the failures thereof are eliminated, and
   the controller, if receiving the elimination of the failure, updates the second arrival time and notifies the notification destination of the updated second arrival time.

3. A job management method in delivery system for delivering sheet printed by an image forming apparatus to a delivery destination with an autonomously moving delivery apparatus, comprising:
   sending a print job to the image forming apparatus;
   calculating printing time relating to completion of execution of the print job by the image forming apparatus and a first arrival time when the delivery apparatus reaches the image forming apparatus;
   enabling the image forming apparatus to execute the print job at a timing when the image forming apparatus can complete the execution of the print job by the first arrival time;
   calculating a second arrival time when the delivery apparatus reaches the delivery destination, and to notify the second arrival time to a registered notification destination;
   updating, in a case in which failures occur in the image forming apparatus and the delivery apparatus, the second arrival time; and
   notifying a notification destination of the updated second arrival time.

4. The job management method according to claim 3, further comprising: updating the second arrival time if receiving the elimination of the failures from the image forming apparatus and the delivery apparatus; and
   notifying the notification destination of the updated second arrival time.

5. A delivery system comprising:
   an image forming apparatus configured to execute printing onto a sheet based on a print job;

a delivery apparatus configured to deliver the sheet printed by the image forming apparatus to a delivery destination; and
a server for sending the print job to the image forming apparatus, comprising:
a processor configured to:
communicate with the image forming apparatus and the delivery apparatus; and
calculate printing time relating to completion of execution of the print job by the image forming apparatus and a first arrival time when the delivery apparatus reaches the image forming apparatus, and to enable the image forming apparatus to execute the print job at a timing when the image forming apparatus can complete the execution of the print job by the first arrival time, and to calculate a second arrival time when the delivery apparatus reaches the delivery destination, and notify the second arrival time to a registered notification destination, and to updates, in a case in which failures occur in the image forming apparatus and the delivery apparatus, the second arrival time, and notify the notification destination of the updated second arrival time.

6. The delivery system according to claim 5, wherein the image forming apparatus and the delivery apparatus notify the server of elimination of the failures, if the failures thereof are eliminated, and
the controller, if receiving the elimination of the failure, updates the second arrival time and notifies the notification destination of the updated second arrival time.

* * * * *